US005989380A

United States Patent [19]

Frischer

[11] Patent Number: 5,989,380

[45] Date of Patent: Nov. 23, 1999

[54] PROCESS OF DRY PRINTING A PAPER-LIKE NON-WOVEN WALL COVERING MATERIAL

[76] Inventor: Paul Frischer, 31 Doral Greens Drive W., Ryebrook, N.Y. 10578

[21] Appl. No.: 08/780,598

[22] Filed: Jan. 8, 1997

[51] Int. Cl.[6] .......................... B32B 31/26; B41M 5/035; D06P 7/00

[52] U.S. Cl. .......................... 156/277; 156/626; 156/259; 156/267; 8/471; 101/492

[58] Field of Search .................................... 156/230, 231, 156/238, 240, 241, 277, 495, 259, 271, 267, 62.6; 101/492, DIG. 42; 226/195; 8/471

[56] References Cited

U.S. PATENT DOCUMENTS

| | | | |
|---|---|---|---|
| Re. 34,093 | 10/1992 | Powell et al. . | |
| 1,608,243 | 11/1926 | Schavoir . | |
| 2,828,219 | 3/1958 | Heiges et al. . | |
| 3,632,291 | 1/1972 | Defago et al. . | |
| 3,768,280 | 10/1973 | Kannegiesser et al. . | |
| 3,960,652 | 6/1976 | Conway et al. . | |
| 3,961,388 | 6/1976 | Jaffa . | |
| 3,974,948 | 8/1976 | Kroppenstedt . | |
| 4,041,197 | 8/1977 | Gagne . | |
| 4,042,453 | 8/1977 | Conway et al. . | |
| 4,104,103 | 8/1978 | Tarullo . | |
| 4,130,685 | 12/1978 | Tarullo . | |
| 4,138,945 | 2/1979 | Rejto . | |
| 4,207,069 | 6/1980 | Ono . | |
| 4,226,594 | 10/1980 | Renault | 8/471 |
| 4,235,657 | 11/1980 | Greenman et al. . | |
| 4,246,311 | 1/1981 | Hirst . | |
| 4,281,598 | 8/1981 | Rump | 8/471 X |
| 4,460,643 | 7/1984 | Stevens et al. . | |
| 4,577,585 | 3/1986 | Anselmo . | |
| 4,650,704 | 3/1987 | Rothenberg . | |
| 5,001,500 | 3/1991 | Wolfberg et al. . | |
| 5,353,706 | 10/1994 | Kerle | 101/492 |
| 5,574,829 | 11/1996 | Wallace et al. . | |

*Primary Examiner*—Curtis Mayes
*Attorney, Agent, or Firm*—Amster, Rothstein & Eberstein

[57] ABSTRACT

A method for dry heat transfer printing a wall covering material utilizing a system comprising at least one transfer cylinder having a heated working surface, comprising processing a non-woven fibrous web material in paper form in overlapping contact with a sublimation dye transfer paper having a decorative pattern to be printed, around a portion of the working surface of the transfer cylinder between a first location and a nip roller engaged against the working surface which exerts a rolling force against the web material, the transfer paper and the working surface as the transfer cylinder rotates about a central axis thereof, at a processing temperature to effect transfer of the decorative pattern from the transfer paper to the web material, the system including a tensioning mechanism disposed proximal the first location, which, in combination with the nip roller, maintains the web material at a sufficient tension to preclude lateral movement of the web material during processing of the web material and the transfer paper on the cylinder, and separating the web material containing, the printed decorative pattern from the transfer paper at a second location proximal to the nip roller.

9 Claims, 3 Drawing Sheets

PROCESS OF DRY PRINTING A PAPER-LIKE NON-WOVEN WALL COVERING MATERIAL

FIELD OF INVENTION

The present invention relates generally to wall coverings, and more particularly, to dry printing a decorative pattern on a paper-like non-woven fibrous web material to produce a "matte" finish with pleasing aesthetic appearance and durable physical characteristics.

BACKGROUND OF THE INVENTION

Wall covering undergoes numerous physical changes as it is transformed from dry roll form, applied to a wall surface, and ultimately removed. Generally, wall covering is unrolled in a dry state, and in preparation for hanging on a wall surface is wetted with paste or submersed in water to activate a prepaste. The wall covering is then bookfolded to enable it to either shrink or expand and allow the wall covering adhesive to "setup". The wall covering is then applied to the wall by stretching and pulling it into position, and then smoothing the same with tools and rollers to evacuate air bubbles and eliminate seams. At this stage, the wall covering is allowed to dry on the wall surface, hopefully without stretching or shrinking. At some time in the future, the wall covering may be stripped from the wall surface, usually a difficult task without causing damage.

Wall coverings must meet several design criteria. The decorative printing should be resistant to UV light, as long term exposure causes undesirable fading. The surface should be washable to enable cleaning everyday spills and inevitable dirt accumulation over long periods of time. The material should be adapted to prevent the formation of bacteria and mold. The texture and surface of the material should be aesthetically pleasing, and the material if so desired should be embossable and paintable. Finally, the materials employed in the process should be environmentally safe and meet ASTM-84 flame certification standards.

Paper wall covering is normally "wet" printed, either by inexpensive single color printing or highly complex and relatively expensive multiple color printing. It has been the dominant wall covering material, and still remains popular. However, due to several shortcomings it has given away a significant market share to vinyl supported wall coverings. Paper has the disadvantage of low physical durability, requires careful preparation of the wall surface before hanging, and is susceptible to expansion and shrinkage during hanging. Paper is usually not washable, susceptible to cracking, and not easily strippable when the wall covering is to be removed.

Another common wall covering is vinyl supported, and utilizes high volume "wet" printing and embossing processing with in-line rotor screen and gravure printing. Vinyl supported wall covering is physically durable and washable, but must be backed by a paper, scrim or non-woven material which adds to the cost and complexity of manufacturing. Furthermore, vinyl is difficult to apply to wall surfaces and requires significant drying time. It also is a good host for mold and bacteria due to its low permeability, and requires a large capital investment for processing.

Non-woven material is commonly used as a backing material, and has lowered manufacturing costs for vinyl supported wall coverings. Non-woven backing improves the physical characteristics of vinyl supported wall covering and increases its strippability, adhesion, and surface appearance. However, without a vinyl plastisol coating or a vinyl laminated surface, non-woven materials are not aesthetically suitable for wall covering. The porous nature and uneven texture of non-woven materials generally causes "bleed through" and dimpling, both considered undesirable results in printing. In addition, without a vinyl plastisol or vinyl laminated surface, non-woven materials are not washable since their low surface durability results in excessive piling.

In summary, printed wall covering paper has acceptable aesthetic qualities with low capital investment, but suffers low physical durability and poor strippability. Vinyl has superior aesthetic qualities for printing and strong physical durability, but requires a supporting material, thereby increasing manufacturing complexity and costs. Non-woven materials used as a backing improve vinyl supported wall covering in adhesion, strippability, and embossing, but are not independently suitable for wall covering without a vinyl plastisol coating or vinyl laminated surface.

SUMMARY OF THE INVENTION

In view of the above described shortcomings in prior art paper and vinyl wall coverings, it is an object of the present invention to provide a new process for dry heat transfer printing a paper-like, non-woven web material that yields a "matte" finish, meets the requisite physical requirements of wall covering, and which can be processed economically with low capital investment.

It is a further object of the present invention to provide a wall covering in accordance with the above that enables direct printing on paper-like non-woven materials with an acceptable level of fit and finish.

It is still another object of the present invention to provide a wall covering in accordance with the above that provides a "paper-like" quality in exture and feel that has superior physical properties for hanging over both paper and vinyl without requiring special tools or rollers to facilitate installation.

It is another object of the invention to provide a wall covering in accordance with the above that may be easily stripped from the wall.

It is yet a further object of the present invention to provide a wall covering in accordance with the above that is resistant to shrinkage and stretching when whetted and dried, and which does not require heavy adhesives such as clear or clay paste to secure the same to a wall surface.

It is still another object of the present invention to provide a wall covering in accordance with the above that can be prepasted prior to or after printing.

It is yet another object of the present invention to provide a wall covering in accordance with the above that inhibits "bleed through" characteristics commonly associated with non-woven materials, yet which does not provide a host for mold and bacteria, typical of low permeability vinyl.

It is still another object of the present invention to provide a wall covering in accordance with the above that can be embossed prior to, during or after printing.

It is another object of the present invention to provide a wall covering in accordance with the above that can be printed in register, and color printed by single or multiple process.

It is yet another object of the present invention to provide a wall covering in accordance with the above that is paintable yet resistant to UV light and crocking.

It is still another object of the present invention to provide a wall covering in accordance with the above that meets governmental ASTM-84 flame standards and UV 5 year standards.

In accordance with the above objects and additional objects that will become apparent hereinafter, the present invention provides a method for dry heat transfer printing a wall covering material utilizing at least one transfer cylinder having a heated working surface, comprising:

(a) dispensing a sublimation dye transfer paper having a decorative pattern to be printed from a source of the transfer paper into contact with the working surface of the transfer cylinder;

(b) dispensing a paper-like, non-woven fibrous web material from a source of the web material to the transfer cylinder and bringing the web material into overlapping contact with the transfer paper at a first location along a circumference of the transfer cylinder;

(c) maintaining the web material in contact with the transfer paper around a portion of the transfer cylinder as the transfer cylinder rotates about a central axis thereof at a processing temperature; and (d) separating the web material from the transfer paper at a second location along the circumference of the transfer cylinder.

In accordance with the inventive method, the paper-like non-woven web material is fabricated by dispersing natural and synthetic fibers that overlap horizontally and vertically on an inclined fiber-collecting wire using known papermaking techniques. An example of such a material is grade 11984, available from Dexter Corporation of Windsor Locks, Conn. The web material is treated with an acrylic binder and a penetration inhibitor. The acrylic binder makes the non-woven material suitable for direct printing without the need for a plastisol coating or vinyl laminate. The penetration inhibitor inhibits migration of wall covering adhesive into the fibrous web.

The process utilizes a slitting station and includes the step of controlling the width of the web material prior to introducing the web material to the transfer cylinder proximal to the first location to establish a side-to-side repeat of the decorative pattern to be printed and to ensure edgewise integrity of the web material.

The web material is stored on a master reel which includes a tensioning bar for tensioning the web material, an introducer roller disposed proximal to the first location where the transfer paper is brought into contact with the working surface of the transfer cylinder and the web material is brought into overlapping contact with the transfer paper, and a nip roller, wherein step (b) includes passing the transfer paper and the web material between the introducer roller and the transfer cylinder and step (c)comprises exerting a rolling contact force against the working surface of the transfer cylinder with the nip roller proximal to the second location to pull the web material into contact with the transfer paper.

The surface of the transfer cylinder is heated to a temperature in the range of from about 350 deg. F to 425 deg. F depending upon the rotation speed of the transfer cylinder and the desired printing effect. The sublimation dye on the transfer sheet undergoes a phase change to the gaseous state and transfers the image to the web material. Heating of the transfer cylinder can be implemented by conventional devices such as oil, electric, infrared or the like.

The invention can also be used with computer generated multi-color sublistatic dyed images on the transfer sheet to enable rapid transfer printing of the decorative images onto the web material.

In accordance with a preferred embodiment of the invention, there is described a method for dry heat transfer printing a wall covering material utilizing at least one transfer cylinder having a heated working surface, comprising:

(a) treating a paper-like, non-woven fibrous web material with an acrylic binder and a penetration inhibitor;

(b) dispensing the web material from a source of the web material and passing the web material through a slitting station to establish a side-to-side repeat of the decorative pattern to be printed and to ensure edgewise integrity of the web material;

(c) dispensing a sublimation dye transfer paper having the decorative pattern to be printed into contact with the working surface of the transfer cylinder from a source of the transfer paper;

(d) transferring the web material from the slitting station to the transfer cylinder and bringing the web material into overlapping contact with the transfer paper at a first location along a circumference of the transfer cylinder;

(e) maintaining the web material in contact with the transfer paper around a portion of the transfer cylinder as the transfer cylinder rotates about a central axis thereof at a processing temperature; and (f) separating the web material containing the printed decorative pattern from the transfer paper at a second location along the circumference of the transfer cylinder.

The many advantages of the present invention will become apparent as it is described in detail below with particular reference to the accompanying figures.

DETAILED DESCRIPTION OF THE PREFERRED EMBODIMENT

Figure 1:
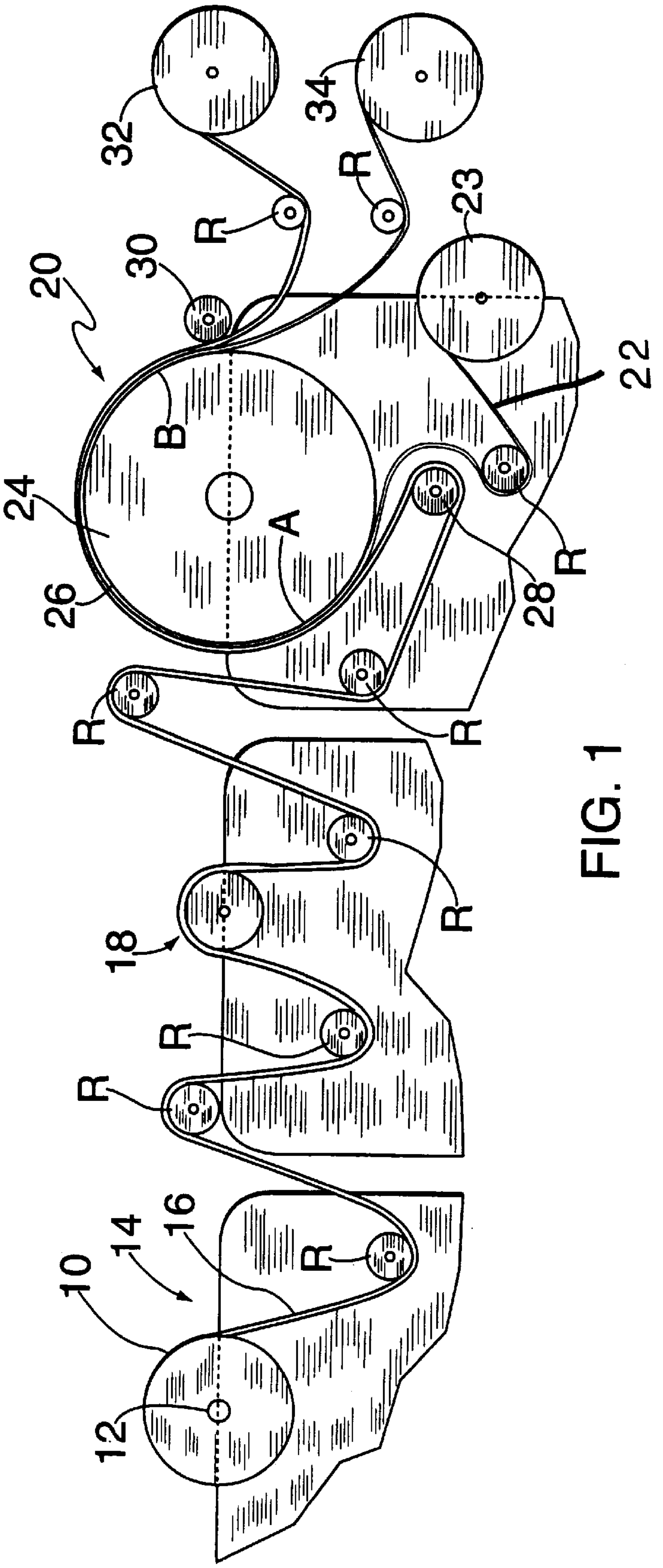
FIG. 1 is a schematic of an exemplary dry transfer printing process in accordance with the present invention.

Referring now to the several views of the drawings, there is shown a method for dry printing a paper-like non-woven fibrous web material with a decorative pattern suitable for use as a wall covering. Specifically, FIG. 1 is a schematic of a series of stations used in a representative dry transfer printing process in accordance with the present invention. A master reel 10 is pivotably supported at pivot point 12 at a first station 14 and contains a paper-like non-woven fibrous web material 16 wrapped on the surface thereon as shown. The fibrous web material is fed to a slitting station 18 via a plurality of rollers generally designated by "R", where it is cut in such a manner as to establish a predetermined side-to-side repeat of the decorative pattern. It is then passed to a transfer station 20 where it is brought into contact with a continuous sheet of sublimation dye transfer paper 22 around a heated transfer cylinder 24 having a working surface 26. An introducer roller 28 is disposed as shown relative to the transfer cylinder 24, near location "A" and the web material 16 and the sublimation dye transfer paper 22 pass through a gap defined between introducer roller 28 and working surface 26. Similarly, a nip roller 30 is disposed proximal to location "B" where the web material and the transfer paper are separated and directed to respective take-up rolls 32 (for the web material) and 34 (for the transfer paper). The particular aspects of the process will be described in greater detail in the following description.

The paper-like non-woven fibrous web material is produced by known and conventional papermaking techniques, in which synthetic and natural fibers are dispersed on a fiber collecting wire in the form of a continuous sheet-like web material. The fiber dispersions may be formed in a conventional manner using water as a dispersant or by employing other suitable fiber dispersant media. Preferably, aqueous dispersions are employed in accordance with known papermaking techniques. The fiber dispersion is formed as a dilute aqueous suspension of papermaking fibers, which is conveyed to the web forming screen or wire of a paper making machine. The fibers are then deposited on the wire to form a fibrous web or sheet that is subsequently dried in a conventional manner. This allows for fibers to overlap horizontally and vertically in a configuration similar to "shingles on a roof." This interlocking action imparts strength and flexibility. The ratio of synthetic to natural fiber dispersion can be altered to adjust for color saturation and permanent fixing of colors. This process is described generally in U.S. Pat. No. 4,460,643 to Dexter Corporation, of Windsor Locks, Conn., the disclosure of which is incorporated herein as through fully set forth herein. A material exhibiting paper-like properties suitable for use in the inventive process may be obtained from Dexter Corporation, and is known as grade 11984. This material neither exhibits the porous nature typically associated with non-woven materials, nor the undesirable low-permeability characteristics of a vinyl plastisol or vinyl laminated surface. It provides evaporation channels for greater permeability, but does not allow the typical "bleed-through" conditions associated with non-woven material.

Figure 2:
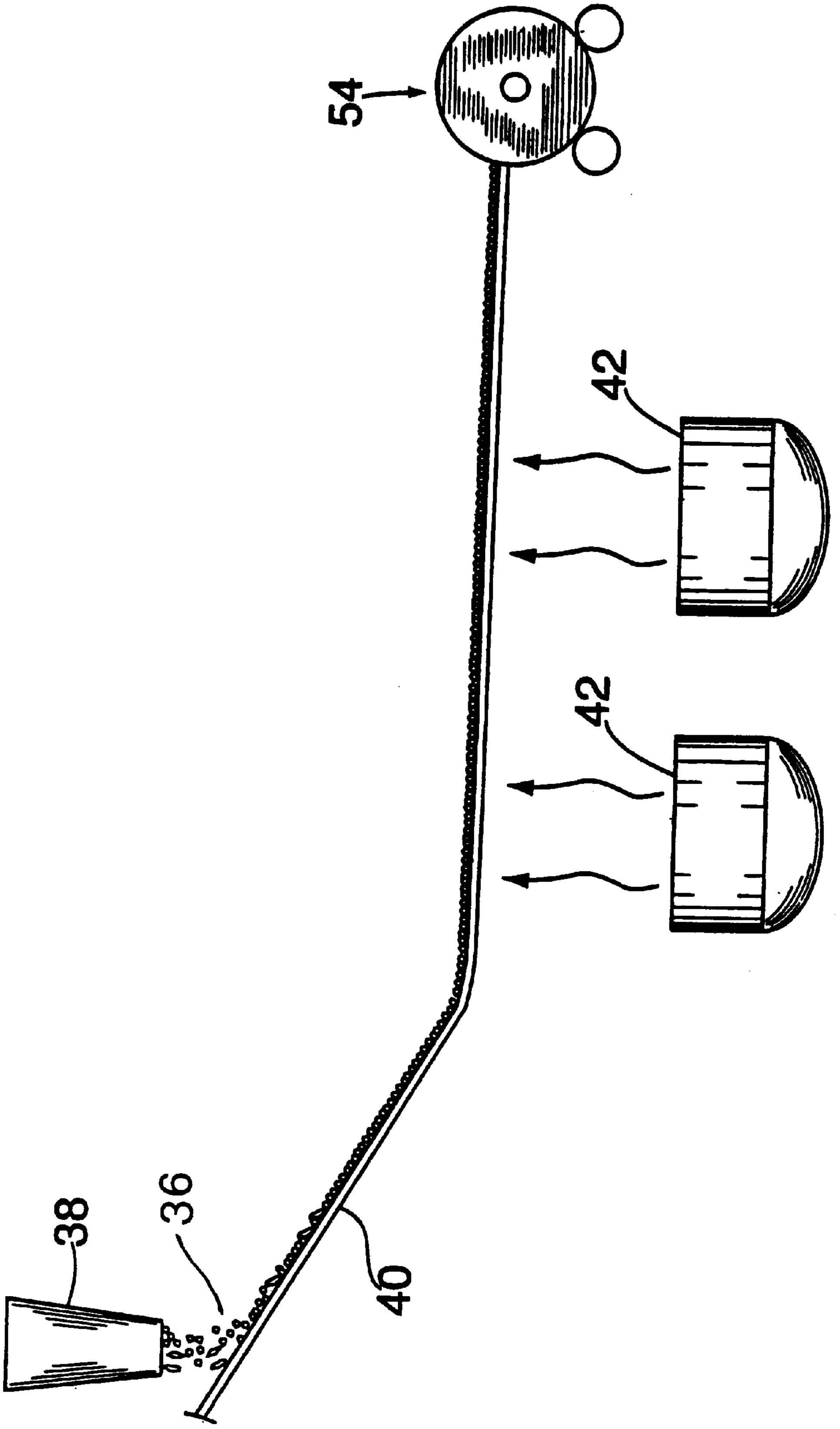
FIG. 2 is a schematic of a paper-like non-woven web material fabrication process.
Figure 3:
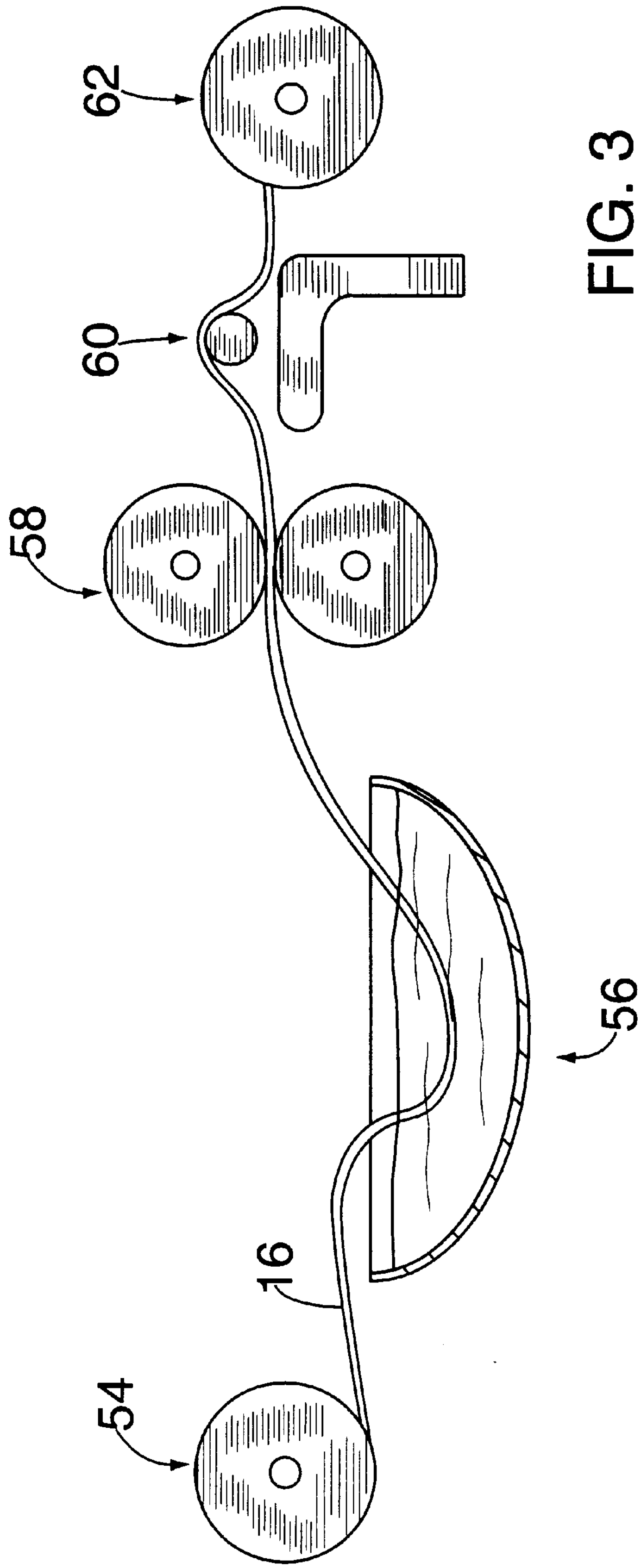
FIG. 3 is a schematic of a web treatment dipping process.

FIG. 2 schematically depicts the fabrication process of the paper-like, non-woven web material 16 in which natural and synthetic fibers 36 are dispensed from a headbox 38 onto an incline wire 40, and then gravity fed along the incline wire to undergo interlocking action. The web material 16 is then advanced to a heater station containing dryers 42 and subsequently dispensed to a roll-up station 54. In FIG. 3 the paper-like non-woven fibrous web material 16 is dispensed from roll-up station 54 and dipped at dipping station 56 into an acrylic binder and penetration inhibitor. The penetration inhibitor is used to prevent migration of wallpaper adhesive used to attach the wall covering to the wall surface. The acrylic binder imparts the desired structural integrity to the web material required for wall covering backing, and provides a suitable surface upon which dry transfer printing may be effected. The acrylic binder and penetration inhibitor may be applied at the same station in accordance with known teachings. After these materials are added, the paper-like non-woven fibrous web material 16 is advanced through a calender station 58 to provide a desired thickness, weight and smooth surface. It is subsequently cut to size at slitter 60 and rolled up on master reel 62.

It is well known in the art to implement continuous heat transfer printing using sublimation dyes in a Nomex blanket heat transfer machine which provides strict control over heat, pressure and dwell time. Since the materials that are most commonly printed are 100% synthetic (i.e., polyester, acrylic, nylon), or of a synthetic composition (i.e., 60% polyester, 40% cotton), the sublimation dyes are dependent upon the characteristics of the synthetic fiber to provide the desired results. A Nomex blanket heat transfer machine, however, is not suitable for use with non-woven materials, because of undesirable wrinkling, wandering of the printed image across the non-woven material, and the inability to print on the outer edges. This is due to the specific attributes of non-woven materials, which require sufficient tension to maintain stability during processing. The Nomex blanket does not provide the necessary tensioning or pulling action to prevent the non-woven material from moving laterally during printing. This side-to-side motion causes wrinkles in the non-woven material and precludes printing of the outer edges due to "strike back". The present invention overcomes the limitations associated with such devices by providing a tensioning system to ensure that the web material 16 is under sufficient tension during the transfer printing process. In this regard, a method in accordance with the present invention comprises the following steps:

(a) dispensing a sublimation die transfer paper 22 having a decorative pattern to be printed from transfer paper reel 23 into contact with working surface 26 of transfer cylinder 24;

(b) dispensing the paper-like non-woven fibrous web material 16 from master reel 10 to transfer cylinder 24 and bringing the web material 16 into overlapping contact with transfer paper 22 at a first location A along the circumference of transfer cylinder 24;

(c) maintaining the web material 16 in contact with the transfer paper 22 around the portion of the transfer cylinder 24 as the transfer cylinder rotates about a central axis thereof at a processing temperature; and (d) separating the web material 16 containing the printed decorative pattern from the transfer paper 22 at a second location B along the circumference of the transfer cylinder 24.

Figure 4:
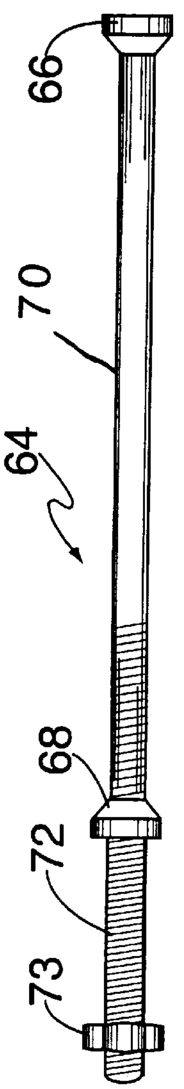
FIG. 4 is a plan view of a tensioning bar assembly.

The master reel 10 includes a tension bar assembly 64 as shown in FIG. 4. Tension bar assembly 64 includes a pair of opposed gripping members 66 and 68 disposed about an elongated shaft 70. Shaft 70 includes a threaded portion 72 on which gripping member 68 is threadably disposed such that the width between retaining members 66 and 68 may be varied so as to impart resistance to the rotation of master reel 10 to compensate for reducing the diameter of the rolled-up web material 16 during processing as it is dispensed into the system. A lock-nut 73 may be urged into contact with gripping member 68 in a conventional manner. As the diameter of the master reel 10 is reduced due to continuous feeding of the web 16 through the system, the amount of centrifugal force generated by the pulling action is reduced, thereby requiring less tension on the master reel 10 to maintain an equal and constant pressure during the dry printing process. By reducing the distance between retaining member 66, 68 pressure is exerted on master reel 10 to increase rolling resistance.

As shown in the drawings, the web material is fed into slitter station 18, such that the width of the web 16 can be established to ensure a proper side-to-side repeat of the decorative pattern to be printed, and to eliminate possible distortion from bruised or damaged edges. This also ensures that the outer portions of each edge can be printed. Each decorative pattern of wall coverings normally has a side-to-side repeat of 20.5, 27, 54 inches, etc. Accordingly, instead of requiring "double-cutting" for matching the side-to-side repeat, the slitting station 18 enables the web material 16 to be cut to exactly match the repeat of the decorative pattern such that the width of the web material 16 used in the transfer printing process is exactly the width of the side-to-side width of the decorative pattern. The slitting station 18 also enables edges of the web material 16 that may have been damaged during transportation to be removed. The precise matching of the width of the web material 16 to the pattern to be printed is important as the sublimation dye undergoes a phase change into the gaseous state while transferring the image onto the web material 16. If the edges of the web material 16 are not clean, or are damaged or bruised, the sublimation dye can escape and leave distorted or irregular printing near the edges. By slitting the edges of the web material 16 prior to printing, the sublimation dye transfer paper 22 can make flush contact with the edges of the web material 16 during printing and distorted and or irregular printing is eliminated.

Referring now to the transfer cylinder 24, it can be seen that an introducer roller 28 is proximally disposed to location A where the web material 16 and transfer paper 22 are bought into overlapping contact on the working surface 20 of the transfer cylinder 24. The respective components are maintained in overlapping relation in order to transfer the sublistatic dyed image from the sublimation transfer paper 22 to the web material 16. The two components are separated at location B after passing between a predetermined gap defined between nip roller 30 and working surface 26 of transfer cylinder 24. The web material 16 having the printed decorative pattern is then communicated to the take-up roll 32 and the transfer paper is advanced to the take-up roll 34 as shown.

The contact point A should be at a location selected to maximize the distance between the initial contact print of the web material 16 with working surface of transfer cylinder 24 and the exit point B proximal to nip roller 32. By increasing this distance, maximum "throughput" can be achieved. Depending upon the distance between point A and B, maximum throughput can be calculated allowing the web material 16 and the sublimation dye transfer paper 22 to remain under equal pressure and constant temperature for a dwell time from about 25–45 seconds, depending upon the desired printed results.

The Nomex blanket used conventional transfer printing systems is eliminated by virtue of the nip roller 30 and variable tensioning mechanism 64 associated with master reel 10. Specifically, nip roller 30 is mounted on an actuating bar which allows for selective engagement and disengagement with working surface 26 of constantly rotating transfer cylinder 24. When nip roller 30 is engaged with working surface 26, the web material 16 is drawn into overlapping contact with transfer paper 22 on working surface 26 of transfer cylinder 24 to provide a mechanism that has constant speed, equal pressure, and uniform pressure. In addition, variable tensioning mechanism 64 enables the necessary back pressure to be maintained so as to stabilize the web material 16 and eliminate wandering and wrinkling as it is continuously "pulled" through slitting station 18, and passes point A on the transfer cylinder 24. The independent introduction of sublimation dye transfer paper 22 is implemented through the action of nip roller 30 being engaged with working surface 26 and the web material 16. The sublimation dye transfer paper 22 is not pulled, but rather introduced at point A and passively drawn into the system without requiring any drive mechanism of its own. This enables continuous processing of any desired decorative pattern by replacing the sublimation dye printed transfer paper 22 without interrupting continuous processing of the web material 16. Additionally, in the event that the side-to-side repeat of the decorative pattern changes, a width adjustment to the web material 16 may be accomplished at the slitting station 18 and no changes to the master reel 10 or sublimation dye transfer paper 22 are required. If the temperature of the working surface 26 of transfer cylinder 24 needs to be increased or decreased in accordance with the printing requirements, nip roller 30 can be disengaged, transfer cylinder 24 adjusted, and the system then restarted without wasting web material 16 or sublimation dye transfer paper 22.

Another benefit of the nip roller system allows for the sublimation dye transfer paper 22 to print the decorative pattern on the edge of the web material 16 without strike back. Although the side-to-side repeat is established by the decorative pattern on the sublimation dye transfer paper 22 and slitting station 18, the width of the sublimation transfer paper 22 is wider than the web material 16 being printed. To allow the width of the sublimation dye transfer paper 22 to extend beyond the width of the non-woven material, the decorative side-to-side repeat on the sublimation dye transfer paper 22 is repeated beyond a single pattern iteration. This allows for printing of the outer edge of the web material 16. Under conventional transfer conditions, such an overlapping condition would normally cause strike back. However, by eliminating the Nomex blanket and utilizing the combination nip roller 30/tensioning mechanism 64 assembly, the overlapped image does not return to strike back and render the edges of web 16 unusable. All web material 16 and exhausted sublimation dye transfer paper 22 is removed from the system at point B, and fed independently to the separate take-up rolls 32, 34 as described above. The master reel of wall covering is removed from roll 32 and then cut-up into single, double or triple roll lengths. The exhaustive sublimation dye transfer paper 22 is then removed.

As the presence of computers and four color printing processes increases, the development of sublistatic printers such as the Xerox 8900 Series may be used to allow for a computer generated image to be output to a sublistatic printer, and then generated on a conveyer sheet in four process color. Currently, the company Visual Edge, has a personal computer output system in partnership with the Xerox Corporation using a Pradia Inc. four process color system of sublistatic inks developed by the Hylord company that can output the necessary four process color sublistatic dye onto the transfer paper using a Xerox 8900 sublistatic printer. The flow of the dye is regulated by the personal computer software developed by Visual Edge to reproduce continuous color saturation of a designated print file at a rate of 25 yards per hour.

The wall covering printed in accordance with the present invention has a high quality "matte" printed surface exhibiting resistance to UV light, crocking, shrinkage, stretching, and the like. It is strippable, paintable and prepared for wall hanging using clear vinyl paste or prepaste. It is flame test certified under ASTM-84, washable and durable to long-term use.

The present invention has been shown and described in what is considered to be the most practical and preferred embodiment. It is anticipated, however, that departures may be made therefrom and that obvious modifications will be implemented by persons skilled in the art.

What is claimed is:

1. A method for dry heat transfer printing a wall covering material utilizing a system comprising at least one transfer cylinder having a heated working surface, said method comprising:

(a) processing a non-woven fibrous web material in paper form in overlapping contact with a sublimation dye transfer paper having a decorative pattern to be printed, around a portion of said working surface of said transfer cylinder between a first location and a nip roller engaged against said working surface which exerts a rolling force against said web material, said transfer paper and said working surface as said transfer cylinder rotates about a central axis thereof, at a processing temperature to effect transfer of the decorative pattern from said transfer paper to said web material, said system including a tensioning mechanism disposed proximal to said first location, which, in combination with said nip roller, maintains said web material at a sufficient tension to preclude lateral movement of said web material during processing of said web material and said transfer paper on said cylinder; and (b) separating said web material containing the printed decorative pattern from said transfer paper at a second location proximal to said nip roller.

2. The dry heat transfer printing method of claim 1, wherein said web material is obtained from a master reel that includes said tensioning mechanism operatively associated therewith.

3. The dry heat transfer printing method of claim 2, wherein said web material received from said master reel, prior to being processed on said transfer cylinder, is passed through a slitting station to slit the edges of said web material to a predetermined width to match the side-to-side repeat of the decorative pattern to be printed and to ensure edgewise integrity of said web material.

4. The dry heat transfer printing method of claim 3, further comprising the step of computer generating a sublistatic dyed image on said transfer sheet prior to processing said web material and said transfer paper on said transfer cylinder.

5. The dry heat transfer printing method of claim 1, wherein said web material is passed over at least one guide roller disposed between said tensioning mechanism and said first location prior to contact with said transfer paper at said first location.

6. The dry heat transfer printing method of claim 1, wherein said web material is fabricated by dispersing fibers that overlap horizontally and vertically on an inclined fiber-collecting wire.

7. The dry heat transfer printing method of claim 1, wherein said web material is treated with an acrylic binder and a penetration inhibitor prior to processing said web material and said transfer paper on said transfer cylinder.

8. The dry heat transfer printing method of claim 1, further comprising the step of computer generating a dyed image on said transfer sheet prior to processing said web material and said transfer paper on said transfer cylinder.

9. The dry heat transfer printing method of claim 1, wherein said working surface of said transfer cylinder is heated to a temperature in the range of from about 350° F. to 425° F.

* * * * *